(12) United States Patent
Trueman et al.

(10) Patent No.: US 8,818,635 B2
(45) Date of Patent: Aug. 26, 2014

(54) ELECTRIC POWER ASSISTED STEERING APPARATUS

(75) Inventors: Neil Trueman, Walsall (GB); George Thomas Dibben, Glenfield (GB)

(73) Assignee: TRW Limited, Midlands (GB)

( * ) Notice: Subject to any disclaimer, the term of this patent is extended or adjusted under 35 U.S.C. 154(b) by 1194 days.

(21) Appl. No.: 12/443,517

(22) PCT Filed: Sep. 28, 2007

(86) PCT No.: PCT/GB2007/003682
§ 371 (c)(1),
(2), (4) Date: Aug. 3, 2010

(87) PCT Pub. No.: WO2008/038006
PCT Pub. Date: Apr. 3, 2008

(65) Prior Publication Data
US 2010/0305815 A1    Dec. 2, 2010

(30) Foreign Application Priority Data

Sep. 30, 2006 (GB) .................................. 0619367.6

(51) Int. Cl.
*B62D 5/04* (2006.01)
(52) U.S. Cl.
CPC .................................. *B62D 5/0463* (2013.01); *B62D 5/0484* (2013.01)
USPC .......................................................... 701/42
(58) Field of Classification Search
None
See application file for complete search history.

(56) References Cited

U.S. PATENT DOCUMENTS 6,226,580 B1 * 5/2001 Noro et al. ...................... 701/42
6,390,229 B1   5/2002 Kaji

FOREIGN PATENT DOCUMENTS

| EP | 1072498 A2 | 1/2001 |
| EP | 1621445 A2 | 2/2006 |
| WO | 2005092689 A1 | 10/2005 |
| WO | 2008038006 A1 | 4/2008 |

OTHER PUBLICATIONS

Search Report for GB0619367.6 dated Nov. 28, 2006.
International Search Report to PCT/GB2007/003682 completed Jan. 18, 2008.

* cited by examiner

*Primary Examiner* — Paul Danneman
(74) *Attorney, Agent, or Firm* — MacMillan, Sobanski & Todd, LLC

(57) ABSTRACT

An electric power assisted steering apparatus for a vehicle, comprising:
a steering mechanism, which operatively connects a steering wheel to road wheels of the vehicle;
an electric motor operatively connected to the steering mechanism;
a torque sensing means adapted to produce a first output signal indicative of the torque carried by a portion of the steering mechanism;
a vehicle speed sensing means for producing a second output signal indicative of the speed of the vehicle;
a signal processing means adapted to receive the first and second signals and to produce a torque demand signal representative of the torque to be applied to the steering mechanism by the motor; and
a motor drive stage adapted to provide a drive current to the motor responsive to the torque demand signal;
wherein the apparatus include at least one of the torque limiter arranged to limit the torque and the maximum rate of increase of the torque following a restart of the apparatus, the limit and rate being determined at least in part by information indicative of a state of the system prior to the restart.

11 Claims, 2 Drawing Sheets

ELECTRIC POWER ASSISTED STEERING APPARATUS

CROSS-REFERENCE TO RELATED APPLICATIONS

This application claims priority to International Patent Application No. PCT/GB2007/003682 filed Sep. 28, 2007, the disclosures of which are incorporated herein by reference in their entirety, and which claimed priority to Great Britain Patent Application No. 0619367.6 filed Sep. 30, 2006, the disclosures of which are incorporated herein by reference in their entirety.

BACKGROUND OF THE INVENTION

This invention relates to improvements in electric power assisted steering apparatus of the kind in which an electric motor is adapted to apply an assistance torque to a steering component such as a steering column so as to reduce the driver effort required to control the vehicle.

In a simple electric power assisted steering (EPAS) apparatus a torque sensor is provided which is arranged such that the level of torque in a steering column is measured. From this measurement a controller calculates the value of a torque demand signal, which includes an assistance torque component that is indicative of the torque that is to be generated by an electric motor attached to the steering column. The motor applies an assistance torque to the column of the same sense as that demanded by the driver and thus reduces the effort needed to turn the wheel.

When such apparatus is initially powered up, it may be the case that the controller calculates that a high assistance torque is demanded by the driver. This could arise if the apparatus shut down unexpectedly whilst the driver was turning at high speed and then reinstated whilst still cornering. Herein, "power up" and "restart" and associated phrases are to be read to include any state in which the EPAS apparatus is initialised following a loss of power, be it intentionally or unintentionally. In such a case, were the motor to suddenly apply a high assistance torque the driver may become alarmed. Accordingly it is known to control the rate at which torque can be applied after a shutdown using a torque limit that increases over time after reinstatement.

In PCT/GB2005/001139 a modification is proposed whereby the speed of the vehicle is measured after reinstatement from a speed sensor associated with the vehicle. The rate at which the maximum torque that can be applied is increased is varied depending on the speed. This can provide a different and faster reinstatement of torque to a stationary vehicle than a fast moving vehicle. This ensures fast recovery at times where the driver is least likely to be alarmed or where such alarm is least dangerous, i.e. when stationary.

BRIEF SUMMARY OF THE INVENTION

According to a first aspect the present invention provides an electric power assisted steering apparatus for a vehicle, comprising: a steering mechanism, which operatively connects a steering wheel to road wheels of the vehicle;
an electric motor operatively connected to the steering mechanism;
a torque sensing means adapted to produce a first output signal indicative of the torque carried by a portion of the steering mechanism;
a vehicle speed sensing means for producing a second output signal indicative of the speed of the vehicle;
a signal processing means adapted to receive the first and second signals and to produce a torque demand signal representative of the torque to be applied to the steering mechanism by the motor; and
a motor drive stage adapted to provide a drive current to the motor responsive to the torque demand signal;
wherein the apparatus include at least one of a torque limiter arranged to limit the torque and the maximum rate of increase of the torque following a restart of the apparatus, the limit and rate being determined at least in part by information indicative of a state of the system prior to the restart.

The information indicative of the state of the system prior to the restart may comprise a flag to indicate whether or not the most recent system shut down prior to the restart occurred normally or abnormally. It may comprise a flag that is raised or lowered to indicate one or other of a normal or abnormal shutdown. More particularly it may comprise a measure of at least one of: engine speed, vehicle speed and torque, all as obtained prior to the restart.

The inventive provision of a controlled torque limit or torque slew-up rate following a shutdown enables the apparatus to provide a different response to a start-up following an abnormal shutdown to that used following a normal shutdown. This can offer significant safety advantages. The use of information about whether a shutdown was normal or abnormal using information obtained prior to the shutdown allows a rapid choice of strategy to be made with no need to wait for the speed sensors to be re-initialised. The applicant has now appreciated that such information may not always be available immediately after restart, and that using prior information can fill this gap. For example, speed sensors are typically provided as part of an anti-lock braking system and may be slow to produce a reliable output.

An abnormal shutdown may comprise a shutdown whilst the vehicle is moving and torque is applied to the steering. This is considered abnormal since it should not happen, and typically occurs if the battery supply disconnects or a fault occurs. It may be indicated by an engine or vehicle speed greater than a predefined threshold and perhaps a non-zero torque demand. A normal shutdown would occur at the end of a journey, with the vehicle at rest and the driver applying no torque to the steering. This will be indicated by a zero or near zero engine speed and perhaps little or no torque.

The apparatus may include a memory in which is stored information which during use can be used after a shutdown and next reinstatement to indicate whether the shutdown was normal or abnormal. This may comprise a non-volatile memory such that the information is retained even if power is lost.

By torque limit, we may mean that apparatus may include a comparison means, which is arranged to compare the magnitude of the torque represented by the torque demand signal and the torque limit and cause the motor to apply a torque having a magnitude of the lower of the two compared values to the steering mechanism. The limit may be expressed as a fraction or percentage of the torque available to be applied to the steering mechanism by the motor.

The apparatus may be adapted to apply a zero torque limit for a set time after a restart when the speed and or torque prior to restart was indicative of an abnormal shutdown. This ensures the torque is introduced gradually and gives time for a valid first and second signal from the speed and torque sensors to be obtained before assistance is applied. This time may be perhaps a fraction of a second, or one second or perhaps more.

The torque limiter may increase the limit from zero or near zero to a higher limit, or unlimited value, over a period of time of perhaps 1 second, or 5 seconds or a minute or more. The slower the increase the less alarm will be caused, but the longer it will take for restart to be complete and normal assistance to be provided. The torque limiting means may be adapted to cease to operate as soon as the torque limit meets the actual torque demand, since at this point the risk of alarming the driver is removed as steering now meets expectations.

During a restart procedure from an abnormal shutdown and whilst limiting is applied, the apparatus may disregard the first signal from the speed sensor and use a default measurement indicative of the speed of the vehicle prior to restart. This ensures that incorrect information from a speed sensor that may not be fully restarted is not used. The assumption that the speed is not going to change much during the relatively short duration of the restart limits is valid in most circumstances. The first signal may be used rather than the default speed if the restart follows a normal shutdown.

Following the restart limit period the default speed may be blended with the first signal until after a period the first signal exclusively is used. This may even be used prior to the end of the limit period, such that the first signal alone is used just as the limit period ends. By blending we mean taking a weighted average of the two signals (default speed and first signal) in which the weight applied to the default is initially greater than that applied to the first signal until the end of the blending in which the weighting applied to the default is less than that applied to the first signal.

The torque sensing means may lapse a torque sensor, such as an optical torque sensor inductive-based sensor or magnetic-type sensor. This list is not intended to be exhaustive.

The vehicle speed sensing means may comprise a pick-up that measures wheel speed of the vehicle and processes this in combination with knowledge of the diameter of the tyre fitted to the wheel. It may take a feed from an ABS sensor fitted to the vehicle.

The signal processing means may couple a dedicated processing circuit or chip, or may comprise a standard processing resource.

According to a second aspect the invention provides a method of controlling an electric power assisted steering apparatus for a vehicle having a steering mechanism comprising:
measuring the torque in a part of the steering apparatus; and
Calculating a torque demand signal indicative of the torque to be applied to the steering mechanism by an electric motor; wherein following a shutdown and next following restart at least one of the method comprises limiting the torque that can be applied and the maximum rate of increase of the torque that can be applied by the electric motor, the limit and rate being determined at least in part by information indicative of a state of the system prior to the restart.

The method may comprise determining information prior to the restart indicative of whether the shutdown was a normal or abnormal shutdown, and applying different limits and or rates of increase in each case.

Other advantages of this invention will become apparent to those skilled in the art from the following detailed description of the preferred embodiments, when read in light of the accompanying drawings.

DETAILED DESCRIPTION OF THE INVENTION

Figure 1:
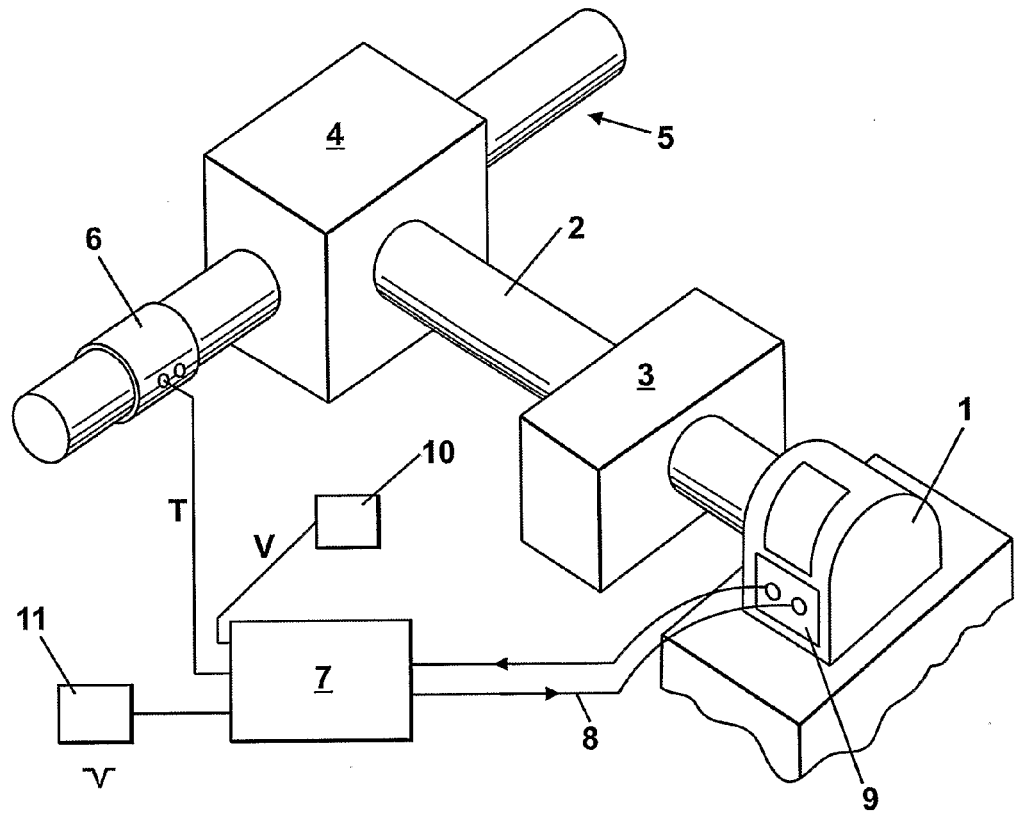
FIG. 1 shows a schematic diagram of an embodiment of an electric power assisted steering system in accordance with the present invention.

An electric power assisted steering apparatus is illustrated in FIG. 1 of the accompanying drawings. The system comprises an electric motor 1, which acts upon a drive shaft 2 through an optional gearbox 3. The drive shaft terminates with a worm gear 4 that co-operates with a wheel provided on a portion of a steering column 5 with a wheel provided on a portion of a steering column 5 or a shaft operatively connected to the steering column.

The steering column carries a torque sensing means, which in the example is a torque sensor 6 that is adapted to measure the torque carried by the steering column that is produced by the driver of the vehicle as the steering wheel is turned against the resisting force provided by the vehicles road wheels (not shown). The output signal T from the torque sensor 6 is fed to a first input of a signal processing means 7. This is typically an electrical circuit, more specifically an ASIC dedicated integrated circuit.

A vehicle speed sensing means, in this example a wheel speed sensor, is also provided. This senses the rotational speed of the road wheels, as is known in the art, by taking readings from an ABS sensor associated with one or more of the wheels. Alternatively it could be GPS based or be fed from the vehicle speedometer. The output V of the sensor is fed to a second input of the processing means.

Furthermore, an engine speed sensor 11 that measures the engine speed v may also be provided. This may comprise a sensor that detects the current flowing into the vehicle alternator—a flow of current indicating that the engine is turning the alternator. Again the output of this sensor may be fed to an input of the processing means 7.

The signal processing means 7 acts upon the two input signals to produce, as its output, a torque signal 8 that is passed to a motor controller 9. The motor controller and associated drive circuitry converts the torque signal 8 into drive currents for the electric motor 1.

The value of the torque signal 8 corresponds to the amount of assistance torque to be applied to the steering column. Normally, this torque will correspond to a torque demand signal and be determined by the torque demanded by the driver. However, as will become apparent this may be modified under some circumstances, particularly after start-up.

The processor is connected to an area of memory 153 in which various values indicative of the state of the system are stored. This is preferably memory in which the values are retained even in the event of a loss of power, such that values written to the memory before a shutdown can be accessed on the next occurring start up. These values comprise an indicator of whether the engine is running, obtained from the vehicle speed and/or torque and/or engine speed sensors.

By shutdown it will be understood that we mean an event in which the steering system is powered down, either in a normal planned manner or in an unplanned manner. For example, this may occur if the battery power supply is temporarily interrupted (abnormal) or when the vehicle ignition is switched off by the driver at the end of a journey (normal).

Figure 2:
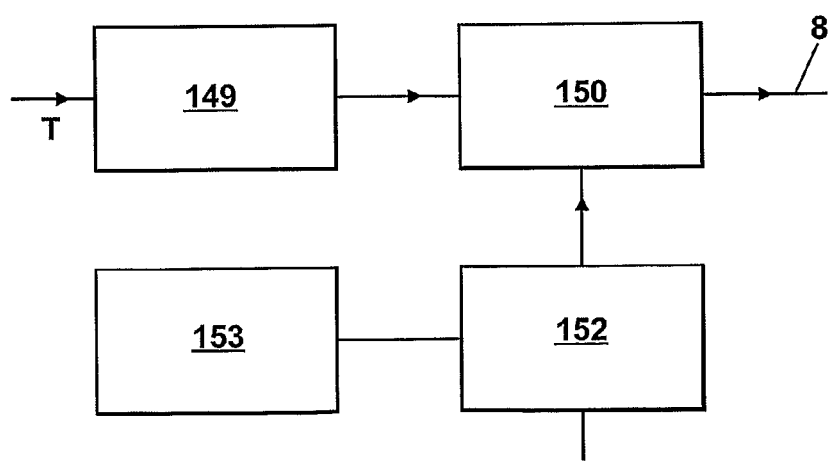
FIG. 2 shows a schematic diagram of the functions carried out within the processor of the embodiment of FIG. 1.

The processor performs the function of controlling the motor to ensure that an appropriate level of assistance is applied. As shown in FIG. 2, the processor 7 includes a demand calculating means 149, which calculates a torque demand from the output of a torque sensor as is well known in the art. This is then passed to a torque limiting means 150 which may limit the demanded torque to produce the torque signal passed to the motor. This limit is determined from either a speed mapping means 152 which tales at its input a current measured vehicle speed signal or a defined vehicle speed determined from the information stored in the memory 153 prior to a restart.

Figure 3:
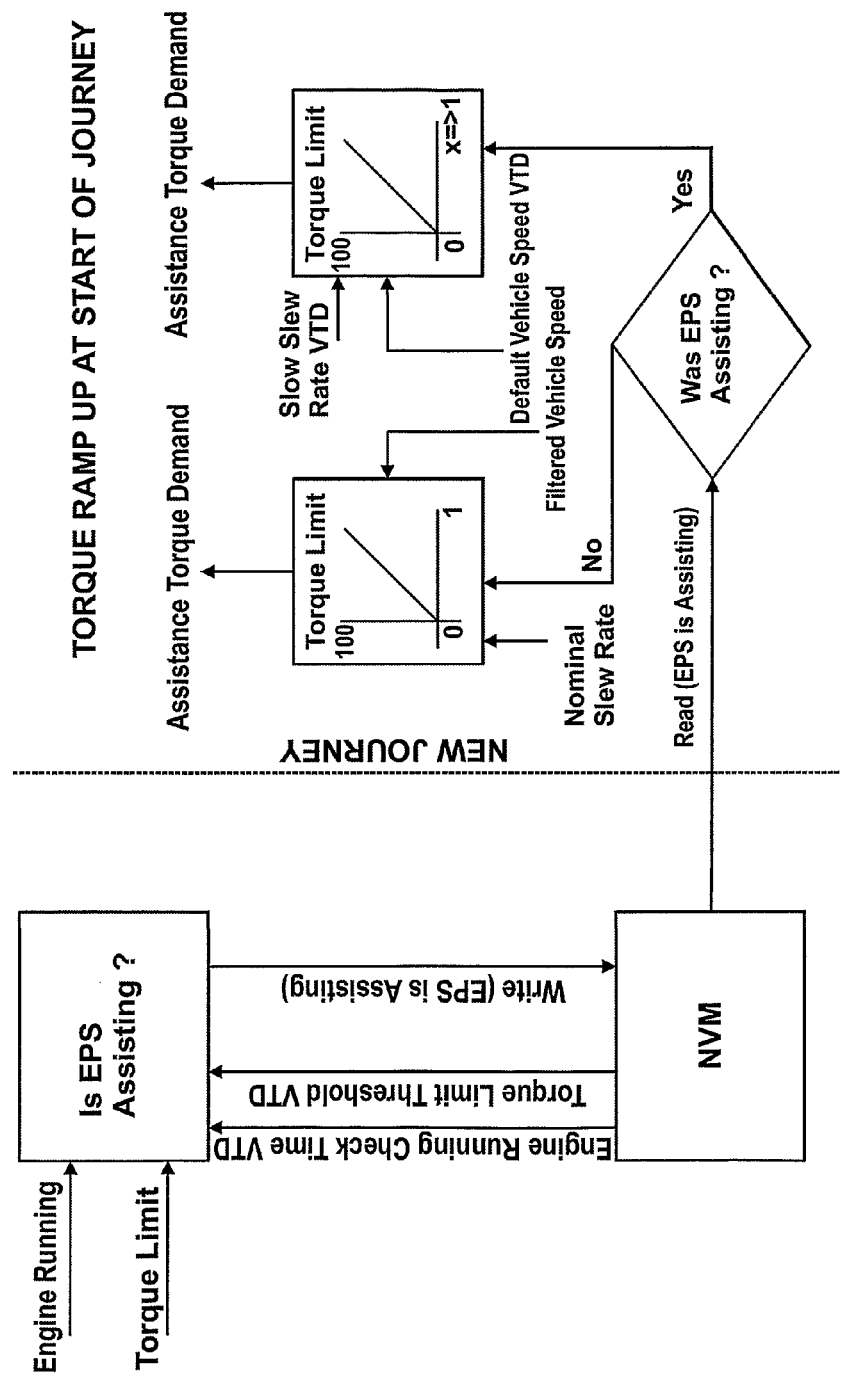
FIG. 3 is an overview of the decision process applied within the processor of the apparatus of FIG. 1.

The output of the torque limiting means controls the increase of torque that can be applied to the motor after a restart according to one or more of the relationships between speed and torque and time as shown in FIG. 3.

FIG. 3 shows the processing steps applied in order to determine a relationship that the speed mapping means applies to the vehicle speed to calculate a slew up rate.

As shown in FIG. 3, two distinctly different start-up strategies are employed by the torque limiting means depending on whether or not the start up follows a normal or abnormal shut down. The strategies differ because it has been appreciated that a different strategy should be used.

On the left of the page are some of the processing steps performed during running of the EPAS apparatus. Specifically, a measurement of engine speed is taken and processed to so as to control the setting in memory of an "EPAS ASSISTING" flag that indicates whether or not the EPAS was assisting. If the engine speed is above a predefined level, say 500 rpm, then EPAS is considered to be assisting. If below the engine is assumed to be switched off and EPAS not assisting.

Following a shutdown and restart, indicated by the dotted line, other processing steps are performed as shown on the right hand side of the diagram of FIG. 3. Specifically, the "EPAS ASSISTING" flag stored before shutdown/restart is interrogated to see if EPAS was assisting or not. A different slew rate is used in each case. If EPAS was not assisting, a relatively fast slew-up rate is used taking approximately 1 second to reach the maximum torque limit. If EPAS was assisting it is assumed that the shutdown was abnormal and a slow slew rate is used to give an unalarming restart. This is indicated in the Figure as having a duration of X>1. A suitable value for X may be 2 seconds.

Also notable is that the vehicle speed measured from the sensor is used in the normal restart, whilst a default speed is used in the slow slew rate restart. This default speed may be determined prior to shut down as the last measured speed. Alternatively it may be any predefined speed, such 10 mph, 20 mph, 30 mph or so on. This overcomes the problem of possible delays in obtaining an accurate speed measurement following an abnormal shutdown and restart.

The effect of the torque limiting means slew rate is to limit the rate at which the torque applied by the motor can increase regardless of the demand made by the driver. It may alternatively be to limit the maximum torque that can be applied and the rate at which the maximum limit is increased over time. This can work in conjunction with the slew rate limiting or as an alternative. For more guidance on this matter, the skilled man is referred to the teachings of the applicants earlier application PCT/GB2005/001339.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electric power assisted steering apparatus for a vehicle, the apparatus comprising:
    a steering mechanism, which operatively connects a steering wheel to road wheels of the vehicle;
    an electric motor operatively connected to said steering mechanism;
    a torque sensing means adapted to produce a first output signal indicative of the torque carried by a portion of said steering mechanism;
    a vehicle speed sensing means for producing a second output signal indicative of the speed of said vehicle;
    a signal processing means adapted to receive said first output signal and said second output signal and to produce a torque demand signal representative of the torque to be applied to said steering mechanism by said motor;
    a motor drive stage adapted to provide a drive current to said motor responsive to said torque demand signal; and
    a torque limiter arranged to limit at least one of the torque and the maximum rate of increase of the torque following a restart of the apparatus, the limit and maximum rate of increase of the torque being determined at least in part by information indicative of a state of the system prior to the restart, and, in the event that the information indicates that the system shutdown normally while a drive current was not being provided to the motor prior to restart, the at least one of the limit and the maximum rate of increase of the torque applied is different than that applied in the event that the information indicates that the system shutdown abnormally while a drive current was being provided to the motor prior to the restart.

2. An electric power assisted steering apparatus according to claim 1 wherein the information indicative of the state of the system prior to the restart comprises a flag to indicate whether or not the most recent system shut down prior to the restart occurred normally or abnormally.

3. An electric power assisted steering apparatus according to claim 1 in which the wherein said information indicative of said state of said system comprises a measure of at least one of: engine speed, vehicle speed and torque, all as obtained prior to the restart.

4. An electric power assisted steering apparatus according to claim 1 further including a comparison means, said comparison means arranged to compare the magnitude of the torque represented by the torque demand signal and the torque limit and cause the motor to apply a torque having a magnitude that is the lower of the two compared values to the steering mechanism.

5. An electric power assisted steering apparatus according to claim 1 which is adapted to apply a zero torque limit for a set time after a restart when at least one of the speed and torque prior to restart was indicative of an abnormal shutdown.

6. An electric power assisted steering apparatus according to claim 1 which is adapted, during a restart procedure from an abnormal shutdown and whilst limiting is applied, to use a default measurement indicative of the speed of the vehicle prior to restart.

7. An electric power assisted steering apparatus according to claim 6 which is adapted to blend said default speed with said first signal for a set time after a restart after which the first signal exclusively is used.

8. A method of controlling an electric power assisted steering apparatus for a vehicle having a steering mechanism, the method comprising the following steps:
    (a) measuring the torque in a part of the steering apparatus;
    (b) calculating a torque demand signal indicative of the torque to be applied to the steering mechanism by an electric motor; and
    (c) applying a drive current to the motor in response to the torque demand signal, wherein at least one of the torque and the maximum rate of increase of the torque that can be applied by the electric motor is limited following a shutdown and next following restart, with the at least one of the limit of the torque and the maximum rate of increase of the torque being determined at least in part by information indicative of a state of the system prior to the restart, and, in the event that the information indicates that the system shutdown normally while a drive current was not being provided to the motor prior to restart, the at least one of the limit and the maximum rate of increase of the torque applied is different than that applied in the event that the information indicates that the system shutdown abnormally while a drive current was being provided to the motor prior to the restart.

9. A power assisted steering apparatus for a vehicle comprising:
- a steering mechanism adapted to operatively connect a steering wheel to road wheels of a vehicle;
- a motor operatively connected to the steering mechanism;
- a torque sensor adapted to produce a first output signal indicative of a torque carried by a portion of the steering mechanism;
- a vehicle speed sensor adapted to produce a second output signal indicative of a speed of the vehicle;
- a signal processor responsive to the first output signal and the second output signal for producing a torque demand signal that is representative of at least one of a torque and a rate of increase of torque to be applied by the motor to the steering mechanism following a shutdown and restart of the apparatus, wherein the signal processor produces different torque demand signals depending upon whether the shutdown occurred (1) normally while a drive current was not being provided to the motor prior to restart or (2) abnormally while a drive current was being provided to the motor prior to the restart; and
- a motor controller that provides a drive current to the motor in response to the torque demand signal.

10. The power assisted steering apparatus according to claim 9 wherein the torque demand signal limits at least one of the torque and the rate of increase of the torque differently following a shutdown and restart of the apparatus.

11. A power assisted steering apparatus for a vehicle having a steering mechanism adapted to operatively connect a steering wheel to road wheels of a vehicle, the power assisted steering apparatus comprising;
- a motor adapted to be operatively connected to a steering mechanism;
- a torque sensor adapted to produce a first output signal indicative of a torque carried by a portion of the steering mechanism;
- a vehicle speed sensor adapted to produce a second output signal indicative of a speed of the vehicle;
- a signal processor responsive to the first output signal and the second output signal for producing a torque demand signal that is representative of at least one of a torque and a rate of increase of torque to be applied by the motor to the steering mechanism following a shutdown and restart of the apparatus, wherein the signal processor produces different torque demand signals depending upon whether the shutdown occurred (1) normally while a drive current was not being provided to the motor prior to restart or (2) abnormally while a drive current was being provided to the motor prior to the restart; and
- a motor controller that provides a drive current to the motor in response to the torque demand signal.

* * * * *